(12) United States Patent
Keohane et al.

(10) Patent No.: US 7,228,395 B2
(45) Date of Patent: Jun. 5, 2007

(54) SYSTEM AND METHOD OF SERVICING READ REQUESTS FROM A COMMON MIRROR

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 10/682,413

(22) Filed: Oct. 9, 2003

(65) Prior Publication Data

US 2005/0081005 A1   Apr. 14, 2005

(51) Int. Cl.
*G06F 12/00* (2006.01)
(52) U.S. Cl. ................................ 711/162; 711/114
(58) Field of Classification Search ............. 711/162, 711/154, 114; 714/6; 707/204
See application file for complete search history.

(56) References Cited

U.S. PATENT DOCUMENTS

| | | | |
|---|---|---|---|
| 5,802,301 A | 9/1998 | Dan et al. ............... 395/200 |
| 5,802,394 A | 9/1998 | Baird et al. ............. 395/825 |
| 5,951,694 A | 9/1999 | Choquier et al. .......... 714/15 |
| 6,032,216 A | 2/2000 | Schmuck et al. ......... 710/200 |
| 6,044,367 A | 3/2000 | Wolff ....................... 707/2 |
| 6,112,257 A | 8/2000 | Mason, Jr. et al. ........ 710/18 |
| 6,223,206 B1 | 4/2001 | Dan et al. ................ 709/105 |
| 6,253,209 B1 | 6/2001 | Chase-Salerno et al. ... 707/104 |
| 6,256,705 B1 | 7/2001 | Li et al. .................... 711/112 |
| 6,453,396 B1 | 9/2002 | Boone et al. ............. 711/162 |
| 6,557,079 B1 | 4/2003 | Mason, Jr. et al. ....... 711/137 |
| 6,611,827 B1 * | 8/2003 | Riedle ...................... 707/1 |

OTHER PUBLICATIONS

*Optimized Process For Balancing Load For Data Mirroring*, by Burkes et al., U.S. Appl. No. 10/189,270, filed on Jul. 3, 2002.
*A Performance Evaluation of RAID Architectures*, by Shenze Chen and Don Towsley, IEEE Transactions on Computers, vol. 45, No. 10 Oct. 1996.

* cited by examiner

*Primary Examiner*—Hiep T. Nguyen
(74) *Attorney, Agent, or Firm*—Volel Emile; Marilyn S. Dawkins (57) ABSTRACT

A system and method of servicing a plurality of read requests using a common mirror are provided. When a plurality of requests is received, it is determined whether the amount of data requested by the read requests is within a user-configurable threshold. The read requests are chained together if the amount of data requested by the read requests is within the user-configurable threshold. After being chained together, the read requests may be sent to the common mirror for servicing. The common mirror, in this case, is a least used mirror in a set of mirrors. To reduce seek and/or rotational time of the common mirror, it may be ascertained that the data being requested by the read requests is within a user-configurable range before chaining the read requests together. In some cases, it may be ascertained that the plurality of read requests is to be grouped together before the read requests are chained together.

24 Claims, 8 Drawing Sheets

FIG. 1

| DATA | LOCATIONS | | |
| --- | --- | --- | --- |
| | $DISK_1$ | $DISK_2$ | $DISK_3$ |
| A | $LOCATION_{1A}$ | $LOCATION_{2A}$ | $LOCATION_{3A}$ |
| B | $LOCATION_{1B}$ | $LOCATION_{2B}$ | $LOCATION_{3B}$ |
| C | $LOCATION_{1C}$ | $LOCATION_{2C}$ | $LOCATION_{3C}$ |

SYSTEM AND METHOD OF SERVICING READ REQUESTS FROM A COMMON MIRROR

BACKGROUND OF THE INVENTION

1. Technical Field

The present invention is directed to storage systems. More specifically, the present invention is directed to a system and method of servicing read requests from a common mirror.

2. Description of Related Art

Most computer systems are made up of at least one processor and one physical storage system. The processor processes, stores and retrieves data from the physical storage system under the guidance of an application program.

Application programs generally run atop an operating system. Among the many tasks of an operating system is that of allowing an application program to have a rather simplistic view of how data (i.e., data files) are stored within a physical storage system. Typically, an application program views the physical storage system as containing a number of hierarchical partitions (i.e., directories) within which entire data files are stored. This simplistic view is often referred to as a logical view since most files are not really stored as unit bodies into directories but rather are broken up into data blocks that may be strewn across the entire physical storage system.

The operating system is able to allow an application program to have this simplistic logical view with the help of a file management system. The file management system stores directory structures, breaks up data files into their constituent data blocks, stores the data blocks throughout a physical storage system and maintains data logs of where every piece of data is stored. Thus, the file management system has to be consulted whenever data files are being stored or retrieved from storage.

Computer systems that have a plurality of physical storage systems (e.g., servers) use an added layer of abstraction when storing and retrieving data. The added layer of abstraction is a logical volume manager (LVM). Volume, in this case, is the storage capacity of a physical storage system. Thus, volume and physical storage system will henceforth be used interchangeably.

The LVM arranges the physical storage systems into volume groups in order to give the impression that storage systems having each a much more voluminous storage capacity are being used. Within each volume group, one or more logical volumes may be defined. Data stored in a logical volume appears to be stored contiguously. However in actuality, the data may be interspersed into many different locations across all the physical storage systems that make up the volume group.

Stated differently, each logical volume in a logical volume group is divided into logical partitions. Likewise, each physical volume in a volume group is divided into physical partitions. Each logical partition corresponds to at least one physical partition. But, although the logical partitions in a logical volume are numbered consecutively or appear to be contiguous to each other, the physical partitions to which they each correspond, need not be contiguous to each other. And indeed, most often, the physical partitions are not contiguous to each other. Thus, one of the many tasks of the LVM is to keep tabs on the location of each physical partition that corresponds to a logical partition.

For fault tolerance and performance, some servers store at least one extra copy of each piece of data onto the physical storage systems they use. For example, if three physical storage systems are used, a server may store a copy of each piece of data in each physical storage system. Storing more than one copy of a piece of data is called mirroring the data. In order to store mirrored data, each logical partition used must correspond to as many physical partitions as there are mirrors (or copies) of the data. In other words, if the data is mirrored three times, for example, each logical partition has to correspond to three physical partitions.

The three physical storage systems in the example above may be referred to as mirrors of each other. Obviously, data may be read from any one of the three mirrors. Several methods of reading data from mirrors have been used. In one method, the mirrors are ranked as first, second and third and data is always read from the first mirror. In another method, data is read from the mirror whose magnetic reading head is closest to the data. In yet another method, data is read from the mirrors in a round robin fashion.

In some instances, however, these methods may not be ideal for reading data from mirrors. For example, in the first method, the mirror from which data is always being read may become a bottleneck while the other mirrors stay idle. Performance of a computer system that uses this method may at times be severely degraded.

In the second method, one mirror may continually service read requests if data to be read is closest to the magnetic head of the mirror. Again, this method may adversely affect performance as that particular mirror may become a bottleneck.

In the third method, data to be read may be closer to the magnetic head of a mirror that just serviced a read request. Nonetheless, a different mirror will be used to service the request. This, of course, may adversely affect performance.

To mitigate the adverse performance of the methods enumerated above, a fourth method has been used. The fourth method uses an algorithm that chooses the least busy of a set of mirrors to service a read request. But if all the mirrors are equally busy, the first mirror to have become busy is used to service the request. In such a case, if a plurality of read requests is received and if each piece of data requested is located close to the next piece of data, different mirrors may be used to service the requests. Clearly, it would be advantageous to have one mirror service these requests.

Hence, what is needed is a system, apparatus and method of chaining a plurality of read requests such that they are issued to one mirror when the locations in which the requested data is stored are close to each other. The read requests may be issued to the least used mirror in a set of mirrors.

SUMMARY OF THE INVENTION

The present invention provides a system and method of servicing a plurality of read requests using a common mirror. When a plurality of requests is received, it is determined whether the amount of data requested by the read requests is within a user-configurable threshold. The read requests are chained together if the amount of data requested by the read requests is within the user-configurable threshold. After being chained together, the read requests may be sent to the common mirror for servicing. The common mirror, in this case, is a least used mirror in a set of mirrors. To reduce seek and/or rotational time of the common mirror, it may be ascertained that the data being requested by the read requests is within a user-configurable range before chaining the read requests together. In some cases, it may be ascertained that the plurality of read requests is to be grouped together before the read requests are chained together.

In a particular embodiment, the system and method of the present invention may service a solitary read request using a common mirror. Particularly, if the solitary read request follows a previous read request and if it is determined that the amount of data requested by the first and the second read requests is within a user-configurable threshold, then the second read request may be sent to the same mirror that services the previous read request. Note that in this case, the second read request will be sent to the mirror that services the previous read request so long as the second read request is received while the previous read request is being serviced or is received within a user-configurable time frame from the previous read request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
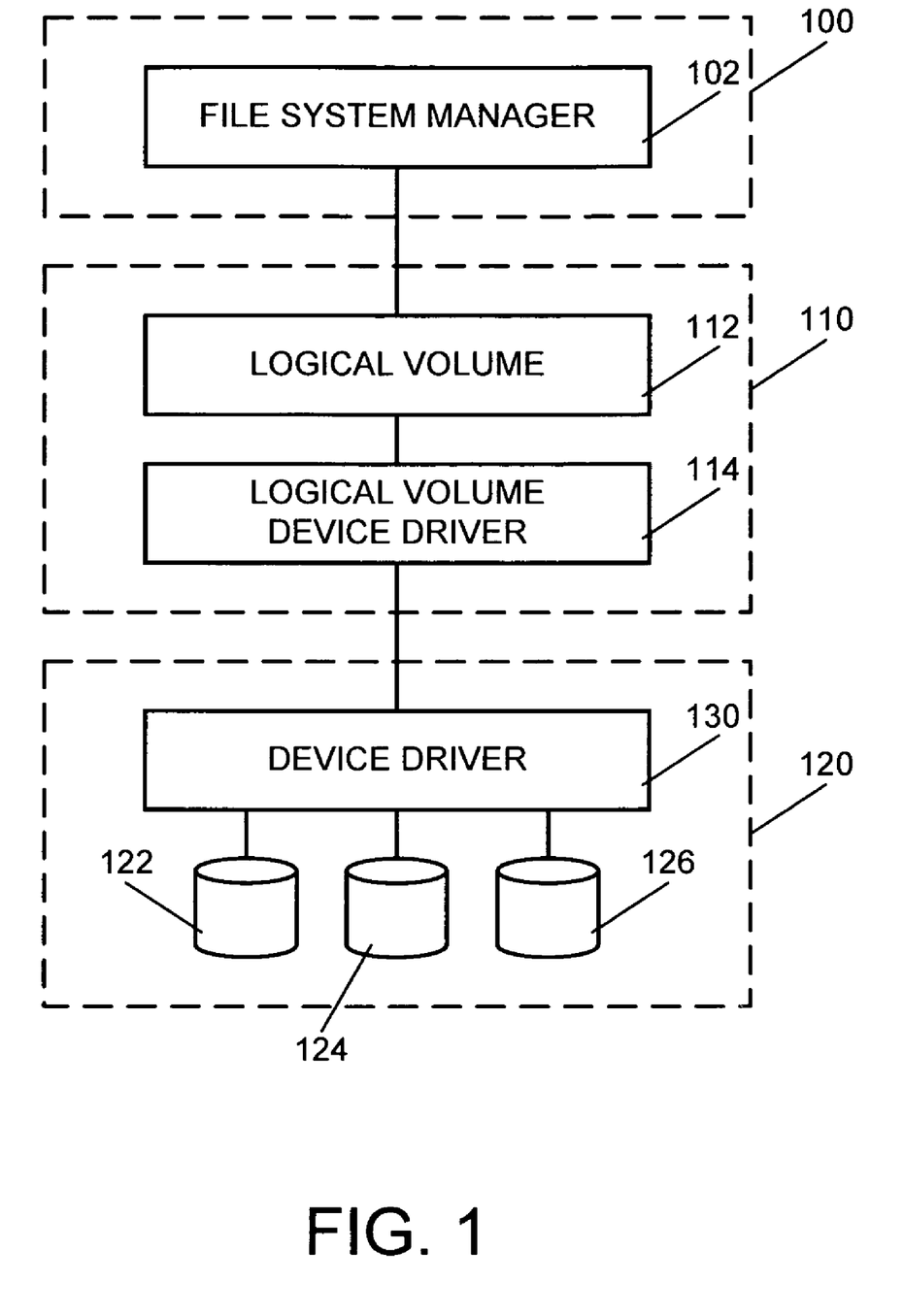
FIG. 1 is a conceptual view of a data storage subsystem.

To better understand the invention, a more detailed explanation of the LVM is needed. The LVM interacts with application programs and the physical storage devices as shown in FIG. 1. In FIG. 1 three layers are depicted in a data storage subsystem, an application layer 100, a logical layer 110 and a physical layer 120 each having one or more devices. It should be noted that the devices shown in the three layers are not all inclusive. There may be more devices in use in each of the application layer 112, the logical layer 110 and the physical layer 130. Thus, the devices in FIG. 1 should be taken only as an example of devices that may be used in a data storage subsystem.

The logical layer 110, for all intent and purpose, is the LVM. The LVM may be regarded as being made up of a set of operating system commands, library subroutines or other tools that allow a user to establish and control the logical volume storage. The LVM controls the physical storage system resources by mapping data between a simple and flexible logical view of storage space and the actual physical storage system. The LVM does this by using a layer of device driver code that runs above traditional device drivers. This logical view of the disk storage is provided to application programs and is independent of the underlying physical disk structure.

The logical layer 110 contains a logical volume 112 that interacts with logical volume device driver 114. A device driver, as is well known in the art, acts as a translator between a device and programs that use the device. That is, the device driver accepts generic commands from programs and translates them into specialized commands for the device. In this case, the logical volume device driver 114 translates commands from an application program that may be executing on the computer system for device driver 130. Thus, when an application program sends commands to file system manager 102 to store or retrieve data from logical volume 112, the file system manager 102 informs the logical volume manager 112 of the application program's wish. The logical volume manager 112 then may convey the wish to the logical volume device driver 114. The logical volume device driver 114 may consult the appropriate map and instruct the device driver 130 which ones of physical storage systems 122, 124 and 126 to use for the data.

Figure 2:
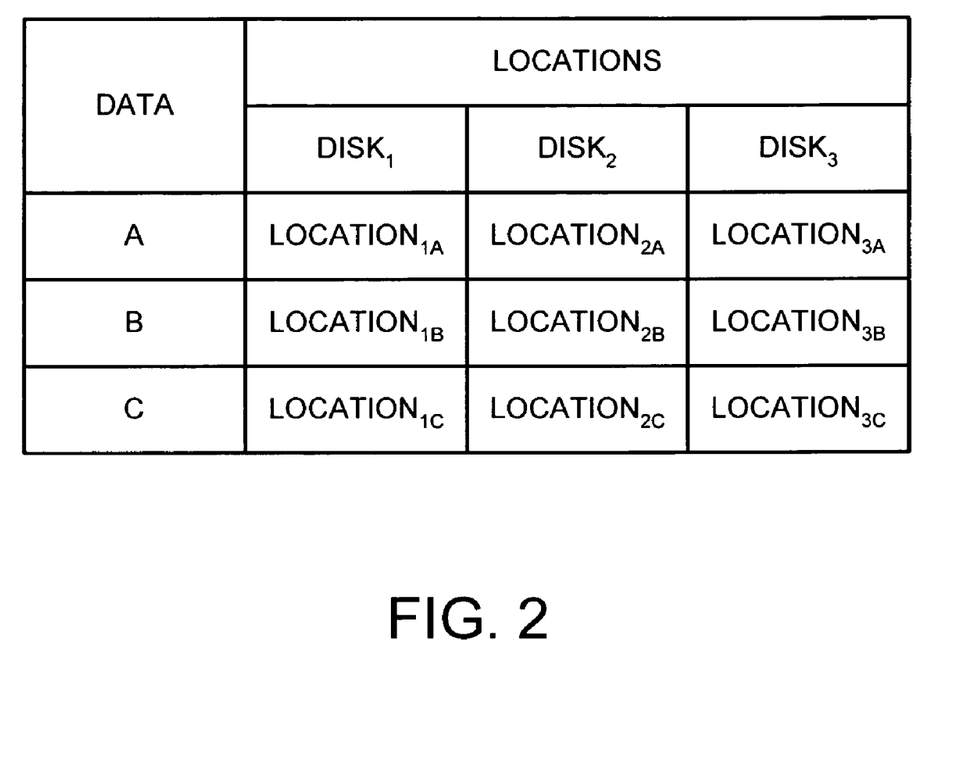
FIG. 2 depicts a conceptual view of a map that may be used by the logical Volume Manager (LVM) of the present invention.
Figure 3:
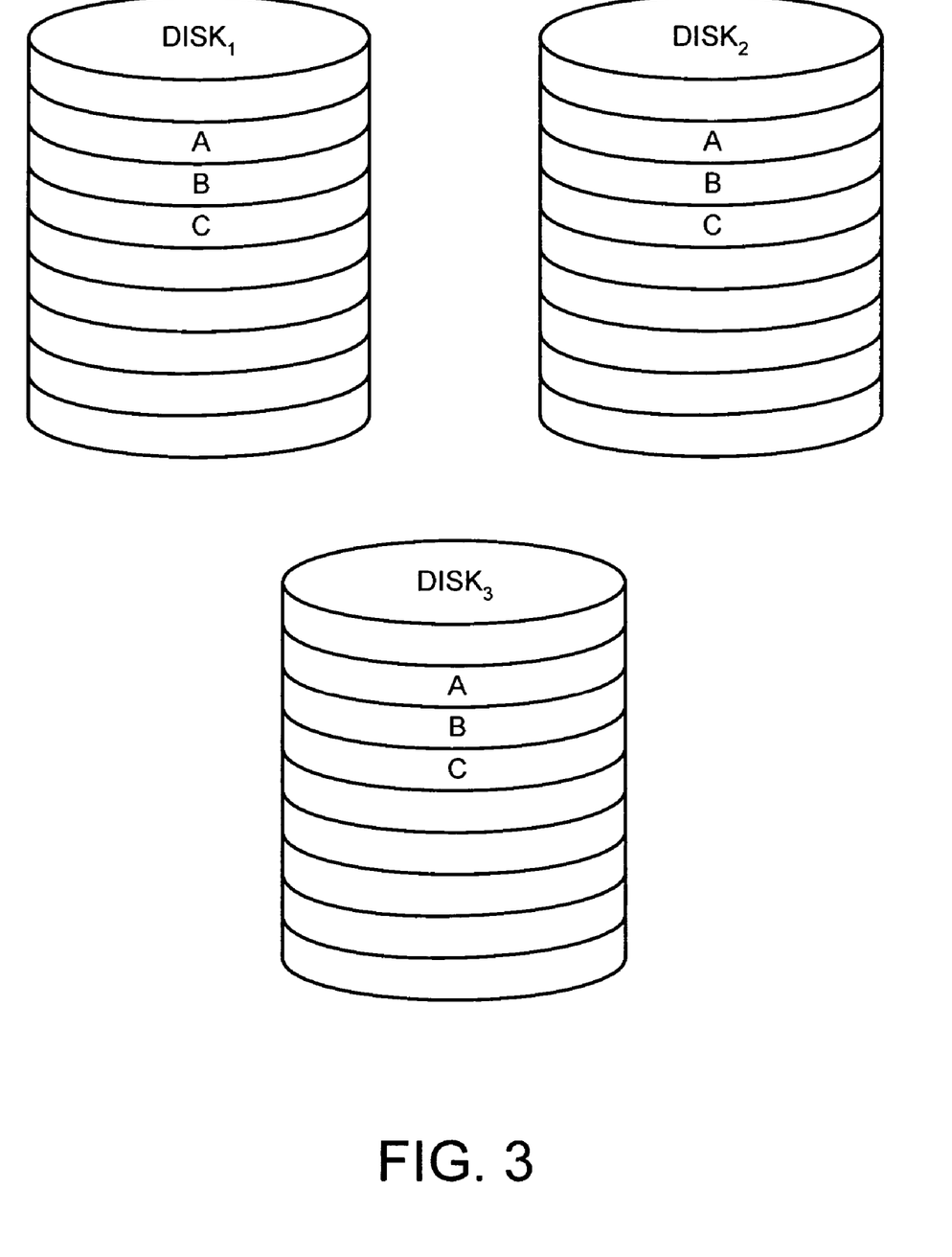
FIG. 3 is a conceptual view of data stored in a set of mirrors.

When data is mirrored, a map is used to correlate the logical volume used to the actual physical storage systems in which the data is stored. Generally, the map includes the partitions or sectors of the physical storage systems that are used and is stored in the LVM. FIG. 2 depicts a conceptual view of an exemplary map. Data A is stored in location$_{1A}$, location$_{2A}$ and in location$_{3A}$ of disk$_1$, disk$_2$ and disk$_3$, respectively. Likewise, data B is in location$_{1B}$, location$_{2B}$ and in location$_{3B}$ and data C is in location$_{1C}$, location$_{2C}$ and in location$_{3C}$ of disk$_1$, disk$_2$ and disk$_3$, respectively. FIG. 3 depicts a logical view of data A, B, C on the disks.

As mentioned before, in the past when all three mirrors (i.e., disk$_1$, disk$_2$ and disk$_3$) were busy and requests for data A, B and C were received, the LVM would send one request to the first mirror to have become busy. The other two requests might have been sent to one of the other two mirrors or each one of the other two mirrors might have serviced one of the other two requests. The present invention, however, may chain together the three requests and have the mirror which has serviced the least number of read requests within a user-configurable time frame service the chained requests. To do so, however, the requests may have to be for data that is within a user-configurable range from each other. For example, if the range is configured to be two megabytes and if data A, B and C are within the two megabyte range, the requests may be chained together and the least used mirror may be used to service the chained requests. In so doing, seek and/or rotational time associated with reading the data may be reduced. Seek time is the time it takes for the magnetic head or heads of a disk drive to move over a sector or sectors of the disk within which the data is contained. Rotational time, on the other hand, is the time it takes for a desired sector to move from where it currently is to where it needs to be for the data to be read.

In order to ensure that the mirror servicing the chained requests does not become too overburdened, a user-configurable input/output (I/O) threshold may be used. That is, if the amount of data to be read is within 10 megabytes, (the user-configurable I/O threshold) for example, the least used mirror may be used to service the chained requests. Otherwise, the requests may not be chained together and more than one mirror may be used to service the requests.

Some application programs do notify the LVM when requests should be logically grouped together. In those instances, the requests may be chained together so long as they are within the user-configurable I/O threshold.

To reduce seek and rotational times, modern disk drives provide a read-ahead feature. The read-ahead feature enables data that is highly likely to be requested in the near future to be pre-fetched. Specifically, since data is generally read in sequence, when a piece of data is read from such disks, an algorithm within the disk controller microcode may instruct the disk to read data that is adjacent to the data being read since it is very likely that it may be requested in the near future. This data is then cached in a buffer on the disk drive. If the data cached is later requested, it may be provided from the buffer instead of being read from the disk. Thus, the latency that would be due to the seek and/or rotational time may be reduced or altogether obviated.

Note that there may be more advanced read-ahead algorithms used instead of the one described above. Thus, the described algorithm is used for illustrative purposes only.

The present invention takes advantage of this read-ahead feature by sending a second request to a mirror that has finished to service a read request so long as the time between the first request and the second request is within a user-configurable time frame and the data being read is within a user-configurable I/O threshold. The user-configurable time frame may be set to the average time it takes for the buffer to be filled up and for data therein to be replaced by new data. As before, the user-configurable I/O threshold may be 10 megabytes.

Further when a second read request is received while a first read request is being serviced, if the data to be read in response to the second read request is located within a user-configurable range from the data being read, then the second read request may be sent to the mirror servicing the first read request if a user-configurable I/O threshold has not been exceeded. In this case, the user-configurable range may again be two megabytes and the user-configurable I/O threshold 10 megabytes.

Figure 4:
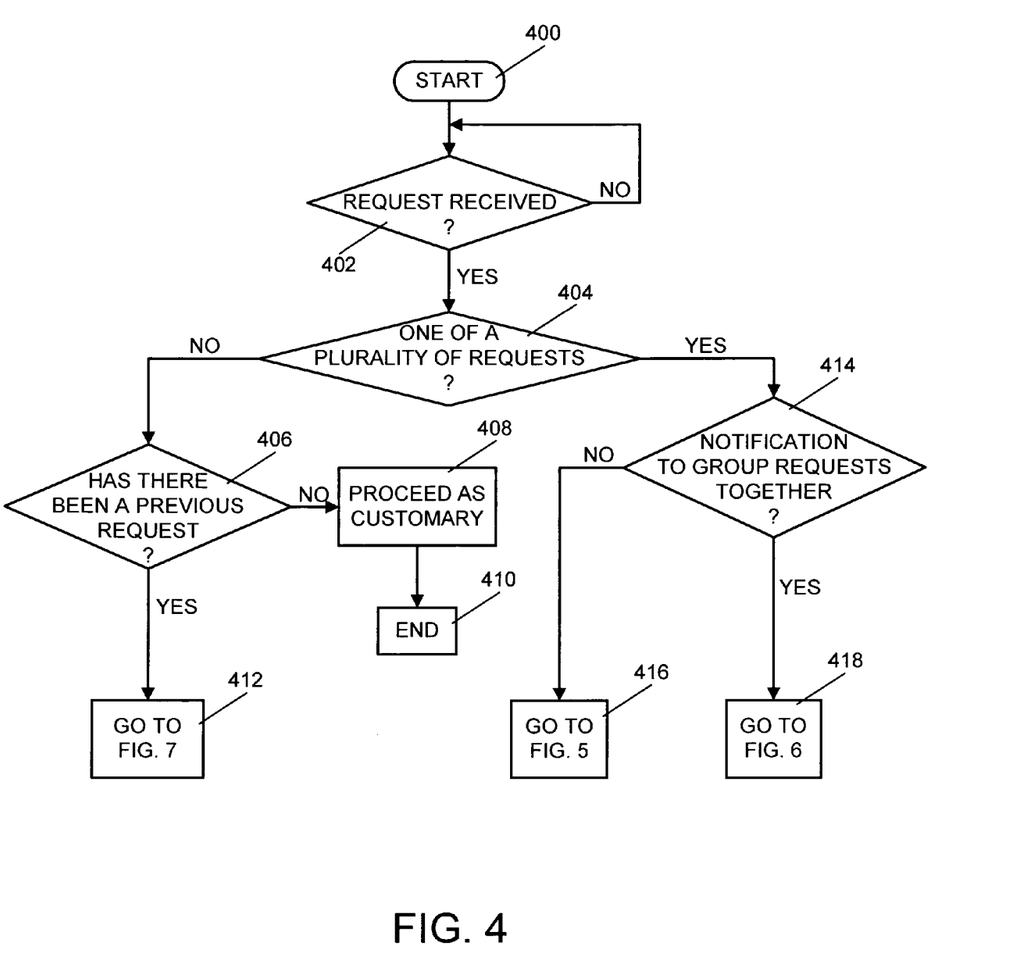
FIG. 4 is a flowchart of a process that may be used to implement the present invention.

FIG. 4 is a flow chart of a process that may be used by the present invention. The process starts when a read request is received (steps 400 and 402). Then a check is made to determine whether the read request is one of a plurality of read requests being received or is a solitary read request. If the request is one of a plurality of read requests being received, a check may be made to determine whether there is a notification regarding grouping the read requests together. If so, the process in FIG. 6 may be followed (steps 404, 414 and 418). If there is no such notification, the process in FIG. 5 may be followed (steps 404, 414 and 416). If the request is a solitary read request, a check may be made to determine whether there has been a previous read request received. If so, the process in FIG. 7 may be followed (steps 404, 406 and 412). Otherwise, the LVM may proceed as customary (steps 404, 406, 408 and 410).

Figure 5:
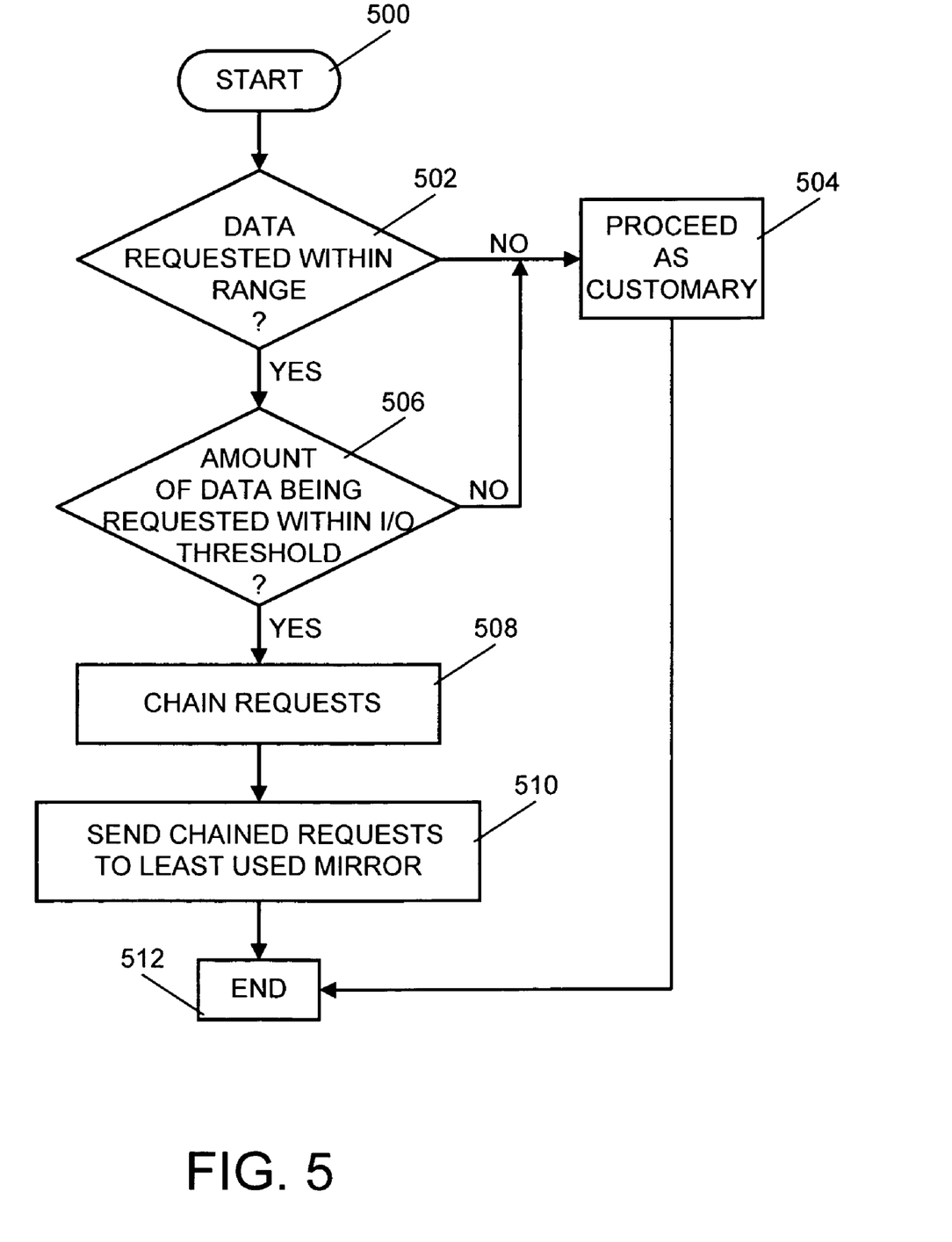
FIG. 5 is a flowchart of a process that may be used by the LVM when a plurality of read requests is received.

FIG. 5 is a flowchart of a process that may be used when a plurality of read requests is received. When the process starts, a check is made to determine whether the data requested is within the user-configured range. If not, the LVM may proceed as customary (steps 500, 502, 504 and 512). If the data being requested is within a user-configured range, another check is made to determine whether the amount of data to be read is within a user-configured I/O threshold. If not, the LVM may proceed as customary (steps 502, 506, 504, 512). If the amount of data to be read is within the user-configured I/O threshold, the read requests may be chained together and sent to the least used mirror of a set of mirrors before the process ends (steps 506, 508, 510 and 512).

Figure 6:
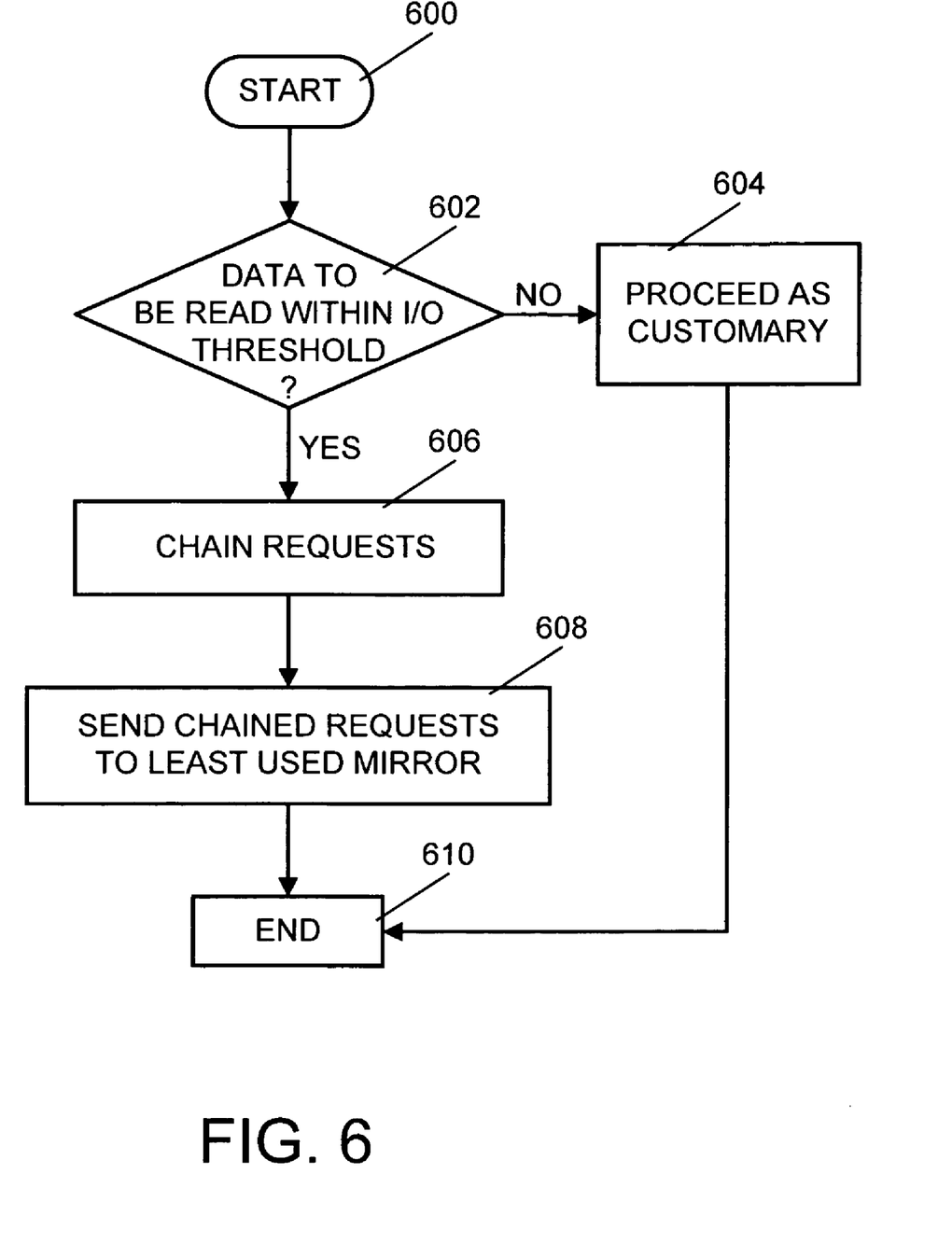
FIG. 6 is a flowchart of a process that may be used by the LVM when there is a notification that a plurality of requests ought to be grouped together.

FIG. 6 is a flowchart of a process that may be used when there is a notification that a plurality of requests ought to be grouped together. When that occurs, a check is made to determine whether the data to be read is within the user-configured I/O threshold. If not the LVM may proceed as customary (steps 600, 602, 604 and 610). If the data to be read is within the user-configured I/O threshold, the requests may be chained together and sent to the least used mirror of the set of mirrors before the process ends (steps 602, 606, 608 and 610).

Figure 7:
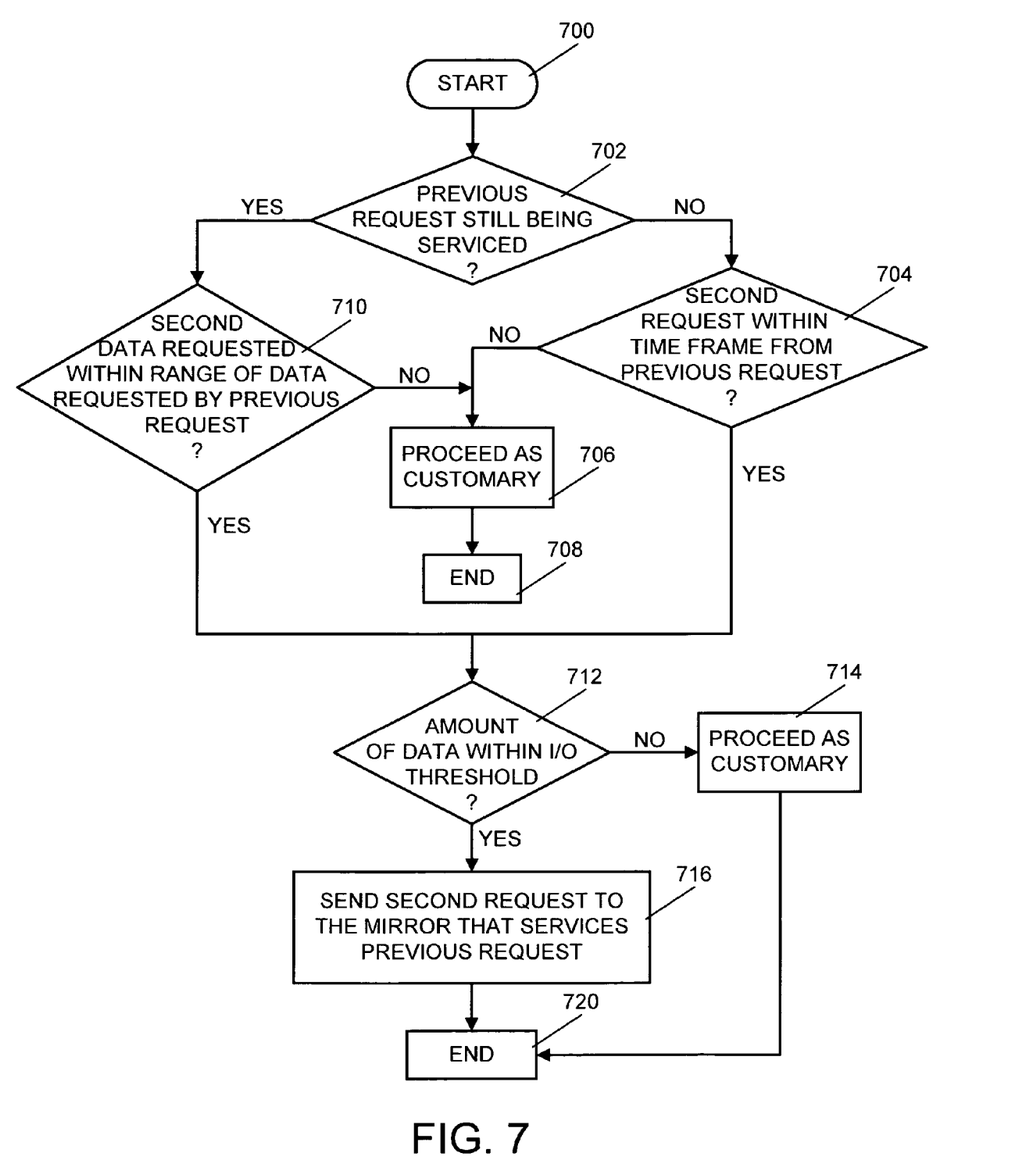
FIG. 7 is a flowchart of a process that may be used by the LVM when the read request received is solitary.

FIG. 7 is a flowchart of a process that may be used when the read request received is solitary. When that is true, a check is made to determine whether the previous read request is still being serviced. If so, another check is made to determine whether the data being requested by the second read request is within the user-configured range from the data requested by the previous read request. If not, the LVM may proceed as customary (steps 700, 702, 710, 706, 708).

If the data being requested by the second read request is within the user-configured range from the data requested by the previous read request, a further check will be made to determine whether the amount of data from both read requests is within the user-configured I/O threshold. If not, the LVM may proceed as customary (steps 710, 712, 714, 720). If the amount of data from both read requests is within the user-configured I/O threshold, the second request may be processed by the same mirror servicing the previous read request (steps 712, 716 and 720).

If the previous read request is still being serviced when the second read request is received, a check may be made to determine whether the second request is received within a user-configured time frame from the previously received request (steps 702, 704 and 712). If so, the process jumps to step 712. Otherwise, the process jumps to step 706 (steps 702, 704 and 706).

Figure 8:
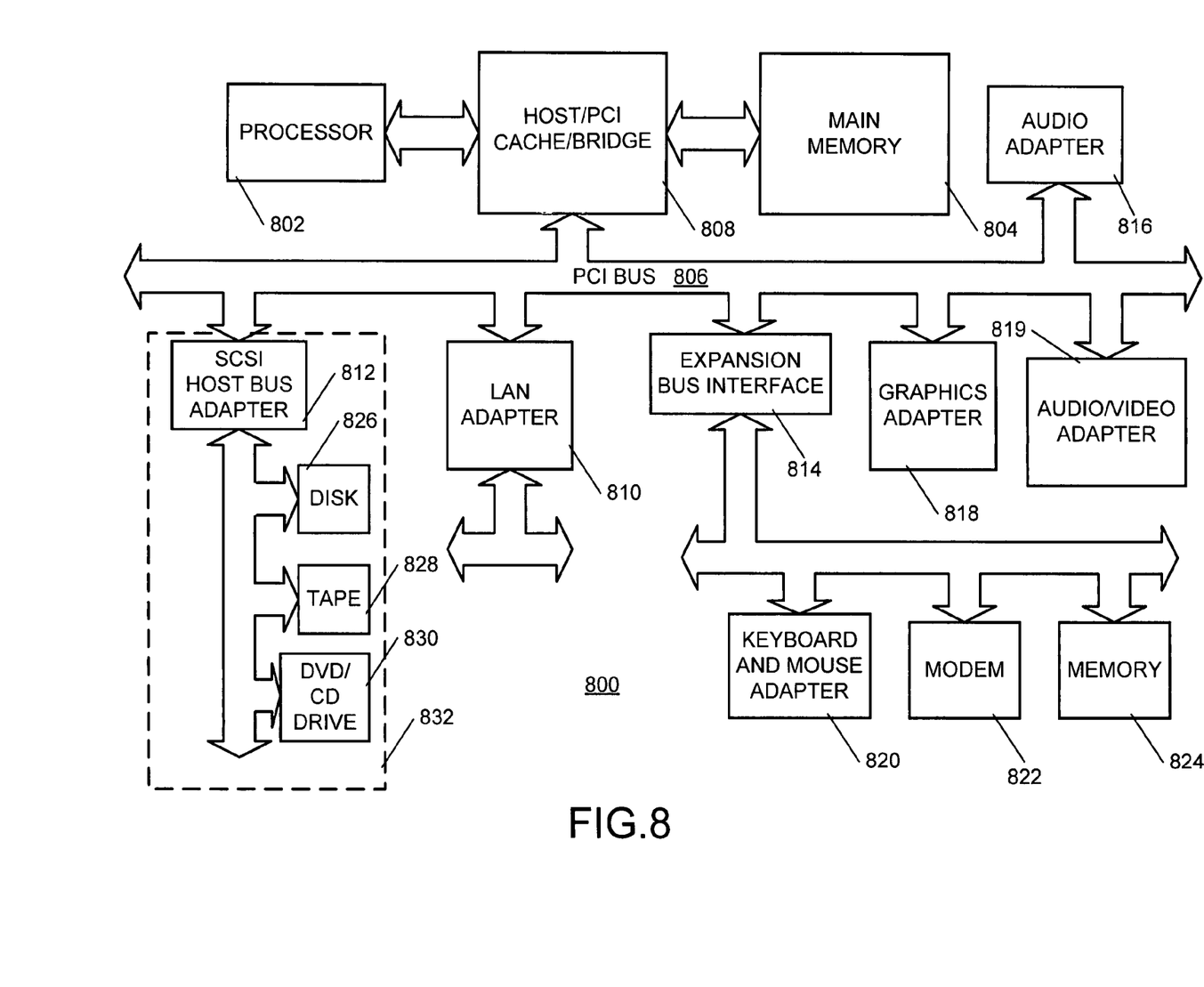
FIG. 8 is an exemplary block diagram of a computer system in which the invention may be implemented.

FIG. 8 is a block diagram illustrating a data processing system in which the present invention may be implemented. Data processing system 800 employs a peripheral component interconnect (PCI) local bus architecture. Although the depicted example employs a PCI bus, other bus architectures such as Accelerated Graphics Port (AGP) and Industry Standard Architecture (ISA) may be used. Processor 802 and main memory 804 are connected to PCI local bus 806 through PCI bridge 808. PCI bridge 808 also may include an integrated memory controller and cache memory for processor 802. Additional connections to PCI local bus 806 may be made through direct component interconnection or through add-in boards. In the depicted example, local area network (LAN) adapter 810, SCSI host bus adapter 812, and expansion bus interface 814 are connected to PCI local bus 806 by direct component connection. In contrast, audio adapter 816, graphics adapter 818, and audio/video adapter 819 are connected to PCI local bus 806 by add-in boards inserted into expansion slots. Expansion bus interface 814 provides a connection for a keyboard and mouse adapter 820, modem 822, and additional memory 824. Small computer system interface (SCSI) host bus adapter 812 provides a connection for hard disk drive 826, tape drive 828, and CD-ROM drive 830. Typical PCI local bus implementations will support three or four PCI expansion slots or add-in connectors.

An operating system runs on processor 802 and is used to coordinate and provide control of various components within data processing system 800 in FIG. 8. The operating system may be a commercially available operating system, such as Windows XP, which is available from Microsoft Corporation or AIX, which is an IBM product. An object oriented programming system such as Java may run in conjunction with the operating system and provide calls to the operating system from Java programs or applications executing on data processing system 800. "Java" is a trademark of Sun Microsystems, Inc. Instructions for the operating system, the object-oriented operating system, and applications or programs as well as the invention are located on storage devices, such as hard disk drive 826, and may be loaded into main memory 804 for execution by processor 802.

Those of ordinary skill in the art will appreciate that the hardware in FIG. 8 may vary depending on the implementation. Other internal hardware or peripheral devices, such as flash ROM (or equivalent nonvolatile memory) or optical disk drives and the like, may be used in addition to or in place of the hardware depicted in FIG. 8. Also, the processes of the present invention may be applied to a multiprocessor data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of servicing a plurality of read requests using a common mirror comprising the steps of:
    determining whether the amount of data requested by the read requests is within a user-configurable threshold;
    chaining the read requests together if the amount of data requested by the read requests is within the user-configurable threshold; and
    sending the chained requests to the common mirror for servicing.

2. The method of claim 1 wherein the common mirror is a least used mirror in a set of mirrors.

3. The method of claim 2 wherein it is ascertained that the data being requested by the read requests is within a user-configurable range before chaining the read requests together.

4. The method of claim 2 wherein it is ascertained that the plurality of read requests is to be grouped together before the read requests are chained together.

5. A method of servicing a read request using a common mirror comprising the steps of:
    receiving a first read request;
    sending the first read request to a mirror to be serviced;
    receiving a second read request;
    determining whether the amount of data requested by the first and the second read requests is within a user-configurable threshold; and
    sending, if the amount of data requested by the first and the second read requests is within the user-configurable threshold, the read request to the mirror to which the first read request was sent to be serviced.

6. The method of claim 5 further including the step of determining whether the first read request is presently being serviced when the second read request is received.

7. The method of claim 6 wherein if the first read request is being serviced when the second read request is received, it is ascertained that the data being requested by the second read request is within a user-configurable range of the data requested by the first read request before the second read request is sent to the same mirror as the first read request.

8. The method of claim 6 wherein if the first read request is not being serviced when the second read request is received, it is ascertained that the second read request is received within a user-configurable time frame from the first read request before the second read request is sent to the same mirror as the first read request.

9. A computer program product on a computer readable medium for servicing a plurality of read requests using a common mirror comprising:
    instruction code for determining whether the amount of data requested by the read requests is within a user-configurable threshold;
    instruction code for chaining together the read requests if the amount of data requested by the read requests is within the user-configurable threshold; and
    instruction code for sending the chained requests to the common mirror for servicing.

10. The computer program product of claim 9 wherein the common mirror is a least used mirror in a set of mirrors.

11. The computer program product of claim 10 wherein it is ascertained that the data being requested by the read requests is within a user-configurable range before chaining the read requests together.

12. The computer program product of claim 10 wherein it is ascertained that the plurality of read requests is to be grouped together before the read requests are chained together.

13. A computer program product on a computer readable medium for servicing a read request using a common mirror comprising:
    instruction code for receiving a first read request;
    instruction code for sending the first read request to a mirror to be serviced;
    instruction code for receiving a second read request;
    instruction code for determining whether the amount of data requested by the first and the second read requests is within a user-configurable threshold; and
    instruction code for sending, if the amount of data requested by the first and the second read requests is within the user-configurable threshold, the read request to the mirror to which the first read request was sent to be serviced.

14. The computer program product of claim 13 further comprising instruction code for determining whether the first read request is presently being serviced when the second read request is received.

15. The computer program product of claim 14 wherein if the first read request is being serviced when the second read request is received, it is ascertained that the data being requested by the second read request is within a user-configurable range of the data requested by the first read request before the second read request is sent to the same mirror as the first read request.

16. The computer program product of claim 14 wherein if the first read request is not being serviced when the second read request is received, it is ascertained that the second read request is received within a user-configurable time frame from the first read request before the second read request is sent to the same mirror as the first read request.

17. A system for servicing a plurality of read requests using a common mirror comprising:
    at least one storage device for storing code data; and
    at least one processor for processing the code data to determine whether the amount of data requested by the read requests is within a user-configurable threshold, to chain together the read requests if the amount of data requested by the read requests is within the user-configurable threshold, and to send the chained requests to the common mirror for servicing.

18. The system of claim 17 wherein the common mirror is a least used mirror in a set of mirrors.

19. The system of claim 18 wherein it is ascertained that the data being requested by the read requests is within a user-configurable range before chaining the read requests together.

20. The system of claim 18 wherein it is ascertained that the plurality of read requests is to be grouped together before the read requests are chained together.

21. A system for servicing a read request using a common mirror comprising:
at least one storage device for storing code data; and
at least one processor for processing the code data to receive a first read request, to send the first read request to a mirror to be serviced, to receive a second read request, to determine whether the amount of data requested by the first and the second read requests is within a user-configurable threshold, and to send, if the amount of data requested by the first and the second read requests is within the user-configurable threshold, the read request to the mirror to which the first read request was sent to be serviced.

22. The system of claim 21 further processing the code data to determine whether the first read request is presently being serviced when the second read request is received.

23. The system of claim 22 wherein if the first read request is being serviced when the second read request is received, it is ascertained that the data being requested by the second read request is within a user-configurable range of the data requested by the first read request before the second read request is sent to the same mirror as the first read request.

24. The system of claim 22 wherein if the first read request is not being serviced when the second read request is received, it is ascertained that the second read request is received within a user-configurable time frame from the first read request before the second read request is sent to the same mirror as the first read request.

* * * * *